(12) United States Patent
Högnabba et al.

(10) Patent No.: US 10,767,573 B2
(45) Date of Patent: Sep. 8, 2020

(54) LIQUEFIED GAS FUEL FEEDING SYSTEM AND A METHOD OF OPERATING A POWER PLANT OF INTERNAL COMBUSTION ENGINES POWERED WITH LIQUEFIED GAS

(71) Applicant: WÄRTSILÄ FINLAND OY, Vaasa (FI)

(72) Inventors: Tomas Högnabba, Vaasa (FI); Piero Zoglia, Trieste (IT); Frans Launonen, Vaasa (FI); Luca Boaro, Trieste (IT)

(73) Assignee: WÄRTSILÄ FINLAND OY, Vaasa (FI)

( * ) Notice: Subject to any disclaimer, the term of this patent is extended or adjusted under 35 U.S.C. 154(b) by 0 days.

(21) Appl. No.: 16/413,092

(22) Filed: May 15, 2019

(65) Prior Publication Data
US 2019/0264623 A1    Aug. 29, 2019

Related U.S. Application Data

(63) Continuation of application No. PCT/FI2016/050804, filed on Nov. 15, 2016.

(51) Int. Cl.
*F02M 21/00*    (2006.01)
*F02D 19/06*    (2006.01)
(Continued)

(52) U.S. Cl.
CPC ....... *F02D 19/0615* (2013.01); *F02D 19/022* (2013.01); *F02D 19/027* (2013.01);
(Continued)

(58) Field of Classification Search
CPC .. F02D 19/0615; F02D 19/027; F02D 19/022; F02M 21/023; F02M 21/0221;
(Continued)

(56) References Cited

U.S. PATENT DOCUMENTS 2,767,691 A * 10/1956 Mengelkamp ............ F02B 7/00
                                                                  123/1 R
2,960,834 A * 11/1960 Kirk Patrick .......... F25J 3/0426
                                                                    62/7
(Continued)

FOREIGN PATENT DOCUMENTS

DE    102016101018 A1    8/2016
EP        2032428 B1     5/2013
(Continued)

OTHER PUBLICATIONS

International Search Report (PCT/ISA/210) dated Oct. 23, 2017, by the Finnish Patent Office as the International Searching Authority for International Application No. PCT/FI2016/050804.
(Continued)

*Primary Examiner* — Hai H Huynh
(74) *Attorney, Agent, or Firm* — Buchanan Ingersoll & Rooney PC

(57) ABSTRACT

A liquefied gas fuel feeding system can include a liquefied gas container configured to store liquefied gas and gaseous gas in cryogenic circumstances, a first fuel passage opening into an ullage space of the gas, a second fuel passage opening into a bottom section of the gas and provided with a controllable pump, at least two fuel delivery passages each configured to convey gas to a single gas consumer of at least two gas consumers, and a valve assembly configured to connect alternatively the first fuel passage or the second fuel passage to each one of the at least two fuel delivery passages.

10 Claims, 2 Drawing Sheets

Figure 1:
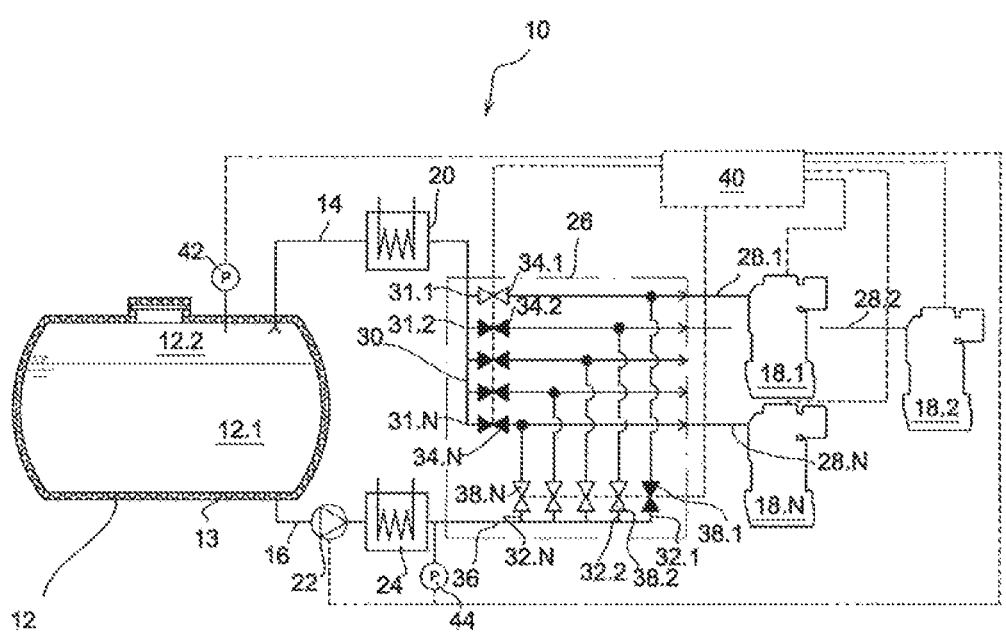

(51) Int. Cl.
*F02D 19/02* (2006.01)
*F02M 21/02* (2006.01)
*B63B 25/16* (2006.01)

(52) U.S. Cl.
CPC ...... *F02M 21/023* (2013.01); *F02M 21/0218* (2013.01); *F02M 21/0221* (2013.01); *F02M 21/0236* (2013.01); *B63B 25/16* (2013.01); *Y02T 10/32* (2013.01); *Y02T 10/36* (2013.01)

(58) Field of Classification Search
CPC ............ F02M 21/0236; F02M 21/0218; B63B 25/16; Y02T 10/32; Y02T 10/36
USPC ..................................... 123/525–529, 27 GE
See application file for complete search history.

(56) References Cited

U.S. PATENT DOCUMENTS

| | | | | |
|---|---|---|---|---|
| 3,756,024 A * | 9/1973 | Gay | ........................ | B64G 1/14 60/204 |
| 5,081,977 A * | 1/1992 | Swenson | ................. | F02B 43/00 123/1 A |
| 5,771,946 A * | 6/1998 | Kooy | ........................ | F17C 6/00 141/11 |
| 8,459,241 B2 * | 6/2013 | Dixon | ................ | F02M 21/0215 123/525 |
| 8,783,281 B2 * | 7/2014 | Carter | ................ | F02M 21/0221 123/304 |
| 9,168,993 B1 | 10/2015 | Lee et al. | | |
| 9,695,983 B2 * | 7/2017 | Mackey | .................... | F17C 1/00 |
| 10,060,375 B2 * | 8/2018 | Takeuchi | ........... | F02M 21/0245 |
| 2014/0290279 A1 | 10/2014 | Lee et al. | | |
| 2015/0226379 A1 | 8/2015 | Lee et al. | | |
| 2015/0285189 A1 | 10/2015 | Lee et al. | | |
| 2015/0300301 A1 | 10/2015 | Lee et al. | | |
| 2016/0123276 A1 * | 5/2016 | Tsujino | .............. | F02M 21/0245 137/565.16 |
| 2016/0215929 A1 | 7/2016 | Lee et al. | | |

FOREIGN PATENT DOCUMENTS

| | | |
|---|---|---|
| KR | 20140052886 A | 5/2014 |
| KR | 20160041127 A | 4/2016 |
| KR | 20160064874 A | 6/2016 |
| WO | 2014065621 A1 | 5/2014 |
| WO | 2016163666 A1 | 10/2016 |

OTHER PUBLICATIONS

Notification of Transmittal of the International Preliminary Report on Patentability (PCT/IPEA/416) dated Oct. 12, 2018.

* cited by examiner

LIQUEFIED GAS FUEL FEEDING SYSTEM AND A METHOD OF OPERATING A POWER PLANT OF INTERNAL COMBUSTION ENGINES POWERED WITH LIQUEFIED GAS

RELATED APPLICATION

The application claims priority as a continuation application under 35 U.S.C. § 120 to PCT/EP2016/050804 filed as an International Application on Nov. 13, 2016 designating the U.S., the entire content of which is hereby incorporated by reference in its entirety.

FIELD

The present disclosure relates to a liquefied gas fuel feeding system and related method.

BACKGROUND INFORMATION

Liquefied gas as a fuel of prime movers in marine vessels and other mobile power plants has increasingly become of interest while importance of environmental issues of such as exhaust emissions have increased.

EP 2032428 B1 discloses an example of a fuel system for gas driven piston engine in a marine vessel, in which gas is stored in at least one fuel storage tank in the vessel as liquefied gas. The fuel feeding system includes a separate fuel feed tank in which the gas is in liquid phase and at elevated pressure. The gas is also in liquid phase in the fuel storage tank, in which, however, prevails only the hydrostatic pressure caused by the liquid gas.

As can be found from the document above liquefied gas can be stored at extremely low temperature and due to, for example, heat transfer from surrounding a part of the gas is evaporated as so called boil off gas.

The gas driven gas consumers configured to combust gaseous fuel have practically always some demands in respect to the pressure of the gas introduced to the gas consumer. Therefore the pressure is controlled.

For example in EP 2032428 B1 there is shown a pressure build up system which controls the pressure in the tank by controlling the evaporation of the liquefied gas in a heat exchanger of the pressure build up system. The fuel is taken from the bottom part of the tank as liquid fuel and the fuel in evaporated into gas before feeding to the engines.

WO2016163666 A1 discloses is a fuel gas supply system. The fuel gas supply system includes a storage tank for storing liquefied gas and boil-off gas of the liquefied gas; a compression unit for compressing the boil-off gas supplied from the storage tank; a first pump for pressurizing the liquefied gas supplied from the storage tank; a vaporizer for vaporizing the pressurized liquefied gas; a first supply line for supplying to an engine the boil-off gas, stored in the storage tank, via the compression unit; a second supply line for joining the boil-off gas, stored in the storage tank, at the rear end of the compression unit of the first supply line, via the first pump and the vaporizer; a measurement unit for measuring the pressure or amount of the boil-off gas supplied to the engine; and a control unit for controlling the first pump and the vaporizer on the basis of the measured value, and supplying the liquefied gas through the second supply line.

The foregoing documents and their disclosures are incorporated herein by reference in their entireties.

SUMMARY

A liquefied gas fuel feeding system is disclosed, comprising: a liquefied gas container configured to store liquefied gas and gaseous gas in cryogenic circumstances; a first fuel passage opening into an ullage space of the gas container; a second fuel passage opening into a bottom section of the gas container and provided with a controllable pump; at least two fuel delivery passages each of which is configured to convey gas to a single gas consumer of at least two gas consumers; and a valve assembly configured to connect the first fuel passage or the second fuel passage alternatively to each one of the at least two fuel delivery passages.

A method is also disclosed of operating a power plant of internal combustion engines powered with liquefied gas, the method comprising: a) storing fuel in a gas container as liquefied gas and gaseous gas in cryogenic circumstances; b) detecting pressure in the container; and c) detecting a demand of fuel pressure of at least one of any running engines of the power plant, wherein: d) when the pressure in the container is higher than the demand of the fuel pressure of the engine, then feeding gaseous gas from the gas container to the engine via a first fuel passage opening into an ullage space of the gas container; and e) when the pressure in the container is lower than the demand of the fuel pressure of the engine, then supplying a flow rate of liquefied gas to a pump via a second fuel passage opening into a bottom section of the gas container, increasing pressure of the liquefied gas to at least a pressure equal to the demand of the fuel pressure in the pump and evaporating liquefied gas and feeding the evaporated gas to the engine; and f) repeating at least the steps c), d) and e) for each one of the engines running in the power plant, wherein a pressure demand information of each one of at least two engines is obtained and the first fuel passage or the second fuel passage is connected alternatively to each one of the at least two fuel delivery passages based on respective pressure demand information.

BRIEF DESCREIPTION OF THE DRAWINGS

Figure 2:
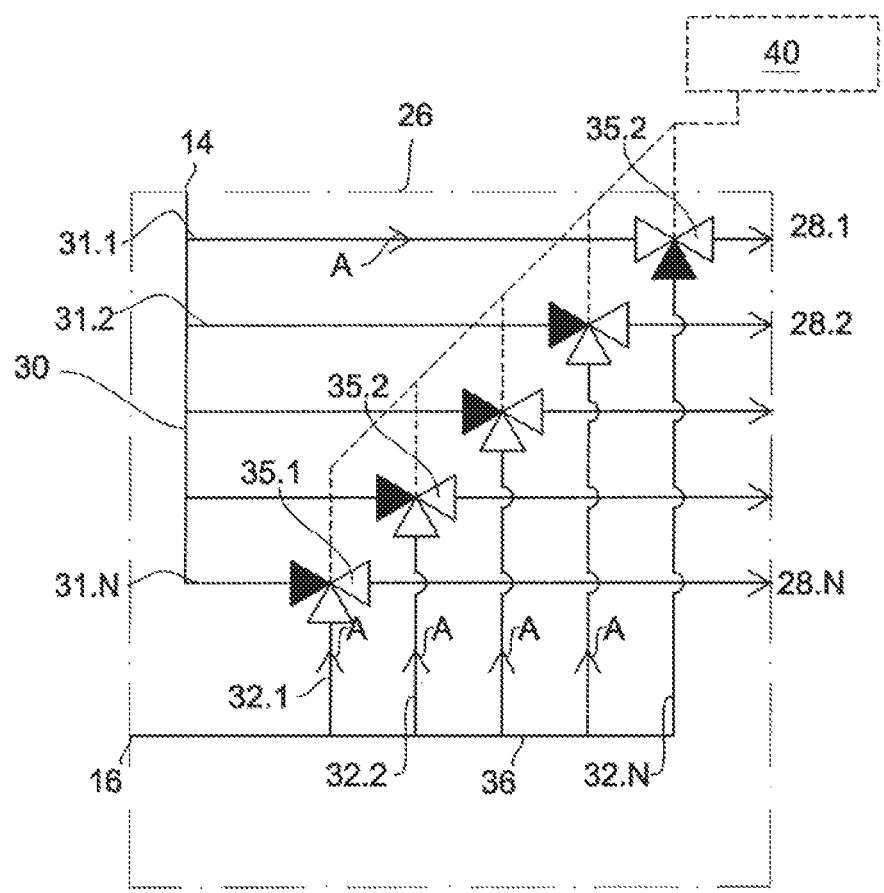

In the following discussion, exemplary embodiments of the present disclosure will be described with reference to the accompanying exemplary, schematic drawings, in which:

In FIG. 1 illustrates a liquefied gas fuel feeding system according to an exemplar embodiment of the disclosure, and In FIG. 2 illustrates an exemplar embodiment of a valve assembly for a liquefied gas fuel feeding system according to an exemplary embodiment of the disclosure.

DETAILED DESCRIPTION

A new liquefied gas fuel feeding system and method of operating a power plant of internal combustion engines powered with liquefied gas are disclosed, which are considerably improved compared to known solutions.

According to an exemplary embodiment disclosed herein the liquefied gas fuel feeding system can include: a liquefied gas container configured to store liquefied gas and gaseous gas in cryogenic circumstances, a first fuel passage opening into an ullage space of the gas, a second fuel passage opening into a bottom section of the gas and provided with a controllable pump, at least two fuel delivery passages each of which being configured to convey gas to a single gas consumer of at least two gas consumers, and a valve assembly configured to connect alternatively the first fuel passage or the second fuel passage to each one of the at least two fuel delivery passages.

This results in effective manner of utilizing the generation of natural boil off gas in the gas container and providing efficient manner of operating the fuel feeding system.

According to an exemplary embodiment of the disclosure, the valve assembly can include first fuel passage which is provided with a first branching manifold which is provided with a number of first branch passages where the first branch passages are arranged parallel to each other, and where the second fuel passage is provided with a second branching manifold which is provided with a number of second branch passages, where the second branch passages are arranged parallel to each other, and where each first branch passage and each respective second branch passage are connected to each other and further to a respective fuel delivery passage and where the fuel delivery passage is selectably connected either to the first branch passage or to the second branch passage by a valve pair.

According to an exemplary embodiment of the disclosure the valve assembly can include the first fuel passage which is provided with a first branching manifold which is provided with a number of first branch passages where the first branch passages are arranged parallel to each other and each one of the first branch passages is provided with a valve, and the second fuel passage is provided with a second branching manifold which is provided with a number of second branch passages, where the second branch passages are arranged parallel to each other and each one of the second branch passages is provided with a valve, and where each first branch passage and each respective second branch passage are connected to each other and further to a respective fuel delivery passage.

According to an exemplary embodiment of the disclosure the fuel feeding system can include a control unit which comprises executable instructions to receive pressure demand information of each one of the at least two gas consumers and which control unit is provided with instructions to connect alternatively the first fuel passage or the second fuel passage to each one of the at least two fuel delivery passages based on the respective pressure demand information.

According to an exemplary embodiment of the disclosure the control unit can include executable instruction to control the pump such that the gas pressure in the second fuel passage is maintained at a value which is maximum value of the required fuel pressure values of the gas consumers connected to the valve assembly.

According to an exemplary embodiment of the disclosure the gas consumers are internal combustion engines which may be operated at different loads. The fuel feeding system can include a control unit which comprises executable instructions to detect the pressure in the container, and to detect the demand of fuel pressure of one of the running engines of the power plant and, if the pressure in the container is higher than the demand of the fuel pressure of the engine, then to feed gaseous gas from the gas container to the engine, and if the pressure in the container is lower than the demand of the fuel pressure of the engine, then to supply a flow rate of liquefied gas to a pump, increasing the pressure of the liquefied gas to at least a pressure equal to the demand of the fuel pressure in the pump, and evaporating liquefied gas and feeding the evaporated gas to the engine, and to repeating the instructions to apply each one of the engines running in the power plant.

A method of operating a power plant of internal combustion engines powered with liquefied gas, can include:
a) storing fuel in a gas container as liquefied gas and gaseous gas in cryogenic circumstances,
b) detecting the pressure in the container, and
c) detecting the demand of fuel pressure of one of the running engines of the power plant
d) if the pressure in the container is higher than the demand of the fuel pressure of the engine, then feeding gaseous gas from the gas container to the engine, and
e) if the pressure in the container is lower than the demand of the fuel pressure of the engine, then supplying a flow rate of liquefied gas to a pump, increasing the pressure of the liquefied gas to at least a pressure equal to the demand of the fuel pressure in the pump and evaporating liquefied gas and feeding the evaporated gas to the engine, and
f) repeating at least the steps c), d) and e) to each one of the engines running in the power plant.

According to an exemplary embodiment of the disclosure a pressure demand information of each one of the at least two engines can be obtained and alternatively the first fuel passage or the second fuel passage is connected to each one of the at least two fuel delivery passages based on the respective pressure demand information.

According to an exemplary embodiment of the disclosure the pump can be controlled such that the gas pressure in the second fuel passage is maintained at a value which is maximum value of the required fuel pressure values of the engines connected to the valve assembly.

Advantageous effects and benefits are obtainable with embodiments as described herein. For example, the natural boil off gas can be efficiently utilized in the system. Since engines running with lower load utilizes the natural boil off gas the energy consumed, or required, for pumping the forced boil off gas is reduced, and/or can be controlled based on actual demand.

The exemplary embodiments presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated. The novel features which are considered as characteristic of the invention are set forth in particular in the appended claims.

FIG. 1 illustrates an exemplary embodiment of a liquefied gas fuel feeding system 10, which is referred to as a fuel feeding system in the following. The fuel feeding system 10 may be assembled in a marine vessel but it is applicable to a land based power plant as well. The fuel feeding system 10 includes a container 12 which is configured to store liquefied gas and gas at gaseous phase, both in cryogenic circumstances. For example, the fuel used may be liquefied natural gas, and it is stored in the container 12 for example, at temperature of about −162° C. (e.g., ±16° C. or lesser or greater) which is considered as cryogenic conditions. The container 12 can include a heat insulation 13 enclosing the actual tank container 12. The insulation may be for example a double wall vacuum insulation to prevent excessive heat transfer into the container and warming up of the LNG in the tank container. The gas can fill the tank container so that a part of the gas is as liquefied gas at the bottom section of the tank 12.1, at a so called liquefied gas space, and part as gaseous gas at the upper part 12.2 i.e. so called ullage space of the container above the of the liquefied gas space.

Even if the container is provided with the heat insulation 13, heat transfer will take place at certain rate which causes evaporation of the liquefied gas. Such gas is referred to here as natural boil off gas, NBOG. Due to the evaporation the pressure in the container increases and therefore the boil of gas may by conveyed to a gas consumer 18 by making use of the pressure in the container 12. For that purposes the fuel feeding system 10 can also include a first fuel passage 14 and a second fuel passage 16 connected to the container 12. The first fuel passage 14 is arranged to open in the ullage space 12.2 of the container 12 such that gaseous gas may flow into the first fuel passage 14. The second fuel passage 16 is arranged to open into the bottom section 12.1 of the container, such that liquefied gas may flow into the second fuel passage 16. The fuel feeding system is configured to provide fuel to more than one gas consumers 18.1, 18.2, . . . 18.N, three of which are shown here as an internal combustion piston engine. Thus the gas consumers are advantageously internal combustion piston engines.

The first fuel passage 14 can include a first heat exchanger 20 which is configured, or adapted, to heat the extremely cold gas up to suitable temperature for feeding into the engines 18.1, 18.2, . . . 18.N. The second fuel passage 16 comprises a pump 22 for increasing the pressure of the liquefied gas drawn from the container 12 into the second fuel passage 16. This way the pressure in the container 12 need not be maintained at a level to meet the highest pressure demand of the engines.

The second fuel passage 16 is also provided with a second heat exchanger 24 which is configured, or adapted, to evaporate the liquefied gas into gaseous form and heat the gas to suitable temperature for feeding into the en-gines 18.1, 18.2, . . . 18.N. The second heat exchanger may be called as a main evaporator because during the operation of the engines the gas taken via the second fuel passage 16 is evaporated continuously while the liquefied gas in the container 12 is fed to the engine 18.1, 18.2, . . . 18.N. Respectively the gaseous gas provided with the main evaporator is called here as forced boil off gas, FBOG.

The fuel feeding system 10 is provided with a valve assembly 26, into which the first fuel passage 14 and the second fuel passage 16 are connected as source of gaseous fuel. The fuel feeding system 10 can include at least two fuel delivery passages 28.1, 28.2, . . . 28.N via which the valve assembly is connected to the engines 18.1, 18.2, . . . 18.N. In the fuel feeding system 10 only one fuel delivery passage 28.1 is connected to one respective engine 18.1 i.e. a gas consumer. Therefore the fuel delivery passage may be called as an engine specific gas line. The valve assembly 26 is configured to connect alternatively the first fuel passage 14 or the second fuel passage 16 to each one of the fuel delivery passages 28.1, 28.2, . . . 28.N. In other words, one engine specific gas line is connected to only one of the first fuel passage 14 and the second fuel passage 16 at a time, but still the connection to either one is selectable according to predefined rules.

The valve assembly according to an exemplary embodiment shown in FIG. 1 can be realized in a following manner. The first fuel passage 14 is provided with a first branching manifold 30 which is provided with a number of first branch passages, i.e. a first one of the first branch passage 31.1, a second one of the first branch passage 31.2 and so on. The first branch passages are arranged parallel to each other such that the natural boil off gas may be introduced to each one of them. Each one of the first branch passages is provided with a valve 34.1, 34.3, . . . 34.N. The second fuel passage 16 is provided with a second branching manifold 36 which is provided with a number of second branch passages i.e. a first one of the second branch passage 32.1, a second one of the second branch passage 32.2, and so on 32.N. The second branch passages are arranged parallel to each other such that the forced boil off gas may be introduced to each one of them. Each one of the second branch passages is provided with a valve 38.1, 38.3, . . . 38.N. In the valve assembly 26 each first branch passage 31.1, 31.2, . . . 31.N and each respective second branch passage 32.1, 32.2, . . . 32.N are connected to each other and further to a respective fuel delivery passage 28.1, 28.2, . . . 28.N.

The valve assembly can be used for distributing the natural boil off gas and the forced boil off gas to the engines in a certain manner, such as that described in the following. The connection of the first branch passage to the second branch passage is downstream the valves which makes it possible to select the source of the fuel—being either natural boil off gas or forced boil off gas—for each gas consumer 18.1 . . . 18.N. The valve 34.1 in the first one of the first branch passage 31.1 and the valve 38.1 in the first one of the second branch passage 32.1 constitute a valve pair 34.1-38.1 the status of which rules whether the engine 18.1 is connected to the first fuel passage 14 or to the second fuel passage 16, that is whether the engine 18.1 provided with natural boil off gas or force boil off gas. The valve pair may be realized also by using 3-way valves, as is shown in the FIG. 2.

In FIG. 1 an open valve is shown without fill, having only a border line, and a closed valve is shown with solid filled valve symbol. Therefore in FIG. 1 the first engine 18.1 is connected to the first fuel passage 14 running with the natural boil off gas, while the other engines are connected to the second fuel passage 16 running with the forced boil off gas.

The liquefied gas fuel feeding system can also be provided with a control unit 40. The control unit may be a dedicated control unit for the fuel feeding system or common to one or all of the gas consumers 18. The control unit can be provided with instruction of required fuel pressure for each one of the gas consumers i.e. the engines 18.1, 18.2, . . . 18.N. For that, it is configured to receive pressure demand information of each one of the at least two gas consumers or engines. The desired or required fuel pressure may be selected based on the current load of the engine 18.1, 18.2, . . . 18.N. The control unit 40 may be provided with a model which provides the required fuel pressure as a function of the engine load. The model may be in a form of a look-up table. The control unit 40 can be provided with instruction of current pressure in the container measured by a first pressure probe 42. The control unit 40 is provided with instruction of current pressure of the force boil off gas in the second fuel passage 16 downstream the pump 22 measured and transmitted by a second pressure probe 44.

The control unit 40 is provided with executable instructions to rule the status of each one of the valve pair 38.1-34.1; 38.2-34.2; 38. N-34. N based on the desired or required fuel pressure of each one of the respective engines 18.1, 18.2, 18.N. The status of the valve pair means that either the valve 34.1 in the first fuel passage 14 is open and the valve 38.1 in the second fuel passage 16 is closed, or the valve 38.1 in the second fuel passage 16 is open and the valve 34.1 in the first fuel passage 14 is closed. The maximum specified, or required fuel pressure, desired or required by anyone of the number of engines, if not available in the container, is produced by the pump 22. The executable instructions to define the status of each one of the valve pair 38.1-34.1; 38.2-34.2; 38.N-34.N comprise instructions to determine if the required fuel pressure of the engine is less than the prevailing pressure in the container and if the result of the determination is true, the instructions comprise command to set the status of the valve pair such that the valve 34.1 in the first fuel passage 14 is open and the valve 38.1 in the second fuel passage 16 is closed. And respective if the result of the determination is false, the instructions can include a command to set the status of the valve pair such that the valve 34.1 in the first fuel passage 14 is closed and the valve 38.1 in the second fuel passage 16 is open. Thus, the control unit can be provided with instructions to connect alternatively the first fuel passage or the second fuel passage to each one of the at least two fuel delivery passages based on the respective pressure demand information. The control unit can also include an executable instruction to control the pump 22 such that the gas pressure in the second fuel passage is maintained at a value which is maximum value of the required fuel pressure values of the gas consumers 18.1, 18.2, 18.N connected to the valve assembly 26.

In FIG. 2 there is shown an exemplary embodiment of the valve assembly 26 which is configured to connect alternatively the first fuel passage 14 or the second fuel passage 16 to each one of the fuel delivery passages 28.1, 28.2, . . . 28.N. In other words, one engine specific gas line 28.N is connected to only one of the first fuel passage 14 and the second fuel passage 16 at a time, but still the connection to either one is selectable according to predefined rules.

In the valve assembly, the first fuel passage 14 is provided with a first branching manifold 30 which is provided with a number of first branch passages, i.e. a first one of the first branch passage 31.1, a second one of the first branch passage 31.2 and so on. The first branch passages are arranged parallel to each other such that the natural boil off gas may be introduced to each one of them. The second fuel passage 16 is provided with a second branching manifold 36 which is provided with a number of second branch passages i.e. a first one of the second branch passage 32.1, a second one of the second branch passage 32.2, and so on 32.N. The second branch passages are arranged parallel to each other such that the forced boil off gas may be introduced to each one of them.

Each one of the first branch passages 31.1 . . . 31.N and each one of the second branch passages 32.1, . . . 32. N are connected to a three way valve 35.1, 35.2, . . . 35.N which three way valve is further connected to a respective fuel delivery passage 28.1, 28.2, . . . 28.N. In the FIG. 2 an open valve section i.e. an open flow direction, is shown without fill, having only a border line symbol, and a closed valve section is shown with solid filled symbol. Therefore in FIG. 1 the first engine 18.1 is connected to the first fuel passage 14 running with the natural boil off gas, while the other engines are connected to the second fuel passage 16 running with the forced boil off gas. The active flow paths are also shown with the arrows A in FIG. 1. The valve assembly is operated under control of the control unit 40 in the same manner as is explained in connection with the FIG. 1.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any disclosed embodiment herein may be used in connection with other embodiments when such combination is technically feasible.

The invention claimed is:

1. A liquefied gas fuel feeding system comprising:
a liquefied gas container configured to store liquefied gas and gaseous gas in cryogenic circumstances;
a first fuel passage opening into an ullage space of the gas container;
a second fuel passage opening into a bottom section of the gas container and provided with a controllable pump;
at least two fuel delivery passages each of which is configured to convey gas to a single gas consumer of at least two gas consumers; and
a valve assembly configured to connect the first fuel passage or the second fuel passage alternatively to each one of the at least two fuel delivery passages.

2. A liquefied gas fuel feeding system according to claim 1, wherein the first fuel passage is provided with a first branching manifold which is provided with a number of first branch passages, where the first branch passages are arranged parallel to each other;
the second fuel passage is provided with a second branching manifold which is provided with a number of second branch passages, where the second branch passages are arranged parallel to each other, and where each first branch passage and each respective second branch passage are connected to each other and to a respective fuel delivery passage, and where the fuel delivery passage is configured and arranged to be selectably connected either to the first branch passage or to the second branch passage by a three way valve of the valve assembly.

3. A liquefied gas fuel feeding system according to claim 1, wherein the first fuel passage is provided with a first branching manifold which is provided with a number of first branch passages, where the first branch passages are arranged parallel to each other and each one of the first branch passages is provided with a valve of the valve assembly; and
the second fuel passage is provided with a second branching manifold which is provided with a number of second branch passages, where the second branch passages are arranged parallel to each other and each one of the second branch passages is provided with a valve of the valve assembly, and where each first branch passage and each respective second branch passage are connected to each other and further to a respective fuel delivery passage.

4. A liquefied gas fuel feeding system according to claim 1, comprising:
a control unit configured with executable instructions to receive pressure demand information of each one of the at least two gas consumers, and which control unit is configured with instructions to connect alternatively the first fuel passage or the second fuel passage to each one of the at least two fuel delivery passages based on respective pressure demand information.

5. A liquefied gas fuel feeding system according to claim 4, wherein the control unit comprises:
executable instruction to control the pump such that gas pressure in the second fuel passage will be maintained at a value which is maximum value of specified fuel pressure values of the gas consumers connected to the valve assembly.

6. A liquefied gas fuel feeding system according to claim 1, wherein the gas consumers are internal combustion piston engines and the fuel feeding system comprises:
a control unit configured with executable instructions to detect pressure in the container, and to detect demand of fuel pressure of one of the engines of the power plant, when in operation, and, when the pressure in the container is higher than a demand of a fuel pressure of the engine, to then feed gaseous gas from the gas container to the engine, and when the pressure in the container is lower than the demand of the fuel pressure of the engine, to then supply a flow rate of liquefied gas to a pump, for increasing the pressure of the liquefied gas to at least a pressure equal to the demand of the fuel pressure in the pump, and evaporating liquefied gas and feeding the evaporated gas to the engine, and to repeating the instructions to apply each one of the engines when in operation in the power plant.

7. A liquefied gas fuel feeding system according to claim 1, comprising:
    a heat exchanger provided in the second fuel passage opening, the heat exchanger adapted to evaporate the liquefied gas.

8. A method of operating a power plant of internal combustion engines powered with liquefied gas, the method comprising:
    a) storing fuel in a gas container as liquefied gas and gaseous gas in cryogenic circumstances;
    b) detecting pressure in the container; and
    c) detecting a demand of fuel pressure of at least one of any running engines of the power plant, wherein:
    d) when the pressure in the container is higher than the demand of the fuel pressure of the engine, then feeding gaseous gas from the gas container to the engine via a first fuel passage opening into an ullage space of the gas container; and
    e) when the pressure in the container is lower than the demand of the fuel pressure of the engine, then supplying a flow rate of liquefied gas to a pump via a second fuel passage opening into a bottom section of the gas container, increasing pressure of the liquefied gas to at least a pressure equal to the demand of the fuel pressure in the pump and evaporating liquefied gas and feeding the evaporated gas to the engine; and
    f) repeating at least the steps c), d) and e) for each one of the engines running in the power plant, wherein
    a pressure demand information of each one of at least two engines is obtained and the first fuel passage or the second fuel passage is connected alternatively to each one of the at least two fuel delivery passages based on respective pressure demand information.

9. A method of operating a power plant of internal combustion engines according to claim 8, the method comprising:
    controlling the pump such that the gas pressure in the second fuel passage is maintained at a value which is a maximum value of specified fuel pressure values of the engines connected to a valve assembly connected to the first fuel passage and to the second fuel passage.

10. A method of operating a power plant of internal combustion engines according to claim 8, the method comprising:
    evaporating the liquefied gas via a heat exchanger positioned within the second fuel passage opening.

* * * * *